US008948983B2

(12) United States Patent
Horii et al.

(10) Patent No.: US 8,948,983 B2
(45) Date of Patent: Feb. 3, 2015

(54) WORKING MACHINE WITH VARIABLE DISPLACEMENT HYDRAULIC PUMP

(75) Inventors: Hiroshi Horii, Sakai (JP); Toshiaki Otani, Sakai (JP); Hisayuki Hiramatsu, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/822,094

(22) PCT Filed: Aug. 9, 2012

(86) PCT No.: PCT/JP2012/070286
§ 371 (c)(1),
(2), (4) Date: Mar. 11, 2013

(87) PCT Pub. No.: WO2013/035484
PCT Pub. Date: Mar. 14, 2013

(65) Prior Publication Data

US 2013/0251490 A1 Sep. 26, 2013

(30) Foreign Application Priority Data

Sep. 8, 2011 (JP) ................................ 2011-196027

(51) Int. Cl.
*E02F 9/22* (2006.01)
*B60W 10/06* (2006.01)
(Continued)

(52) U.S. Cl.
CPC ................ *E02F 9/22* (2013.01); *E02F 9/2207* (2013.01); *E02F 9/2285* (2013.01); *E02F 9/2292* (2013.01); *E02F 9/2296* (2013.01);
(Continued)

(58) Field of Classification Search
None
See application file for complete search history.

(56) References Cited

U.S. PATENT DOCUMENTS

2007/0101708 A1* 5/2007 Ohigashi et al. ................ 60/431
2009/0217654 A1* 9/2009 Iwamoto ......................... 60/449
(Continued)

FOREIGN PATENT DOCUMENTS

JP 4-194383 A 7/1992
JP 5-280070 A 10/1993
(Continued)

*Primary Examiner* — John R Olszewski
*Assistant Examiner* — Jess Whittington
(74) *Attorney, Agent, or Firm* — Birch, Stewart, Kolasch & Birch, LLP

(57) ABSTRACT

A working machine rendered to change in setting a maximum value of an absorption torque of hydraulic pump to a rather high value when the working machine is in a specified state, solves problems that, when an operation lever is being operated in an intermediate position of a lever stroke, there occurs a swinging in a machine body due to change-over of a maximum absorption torque setting value so that the operation lever is relatively moved with respect to the machine body to exert an influence on operability and the machine body acting violently. When the maximum absorption torque setting value is E2 position which is good fuel efficiency, upon detection of a full operation of either one or both of the travelling operation member and the boom operation member, controlling to automatically switch to E1 position of a maximum absorption torque larger than that of E2 position is performed.

4 Claims, 7 Drawing Sheets

(51) Int. Cl.
*F15B 11/16* (2006.01)
*E02F 9/20* (2006.01)
*F15B 21/04* (2006.01)

(52) U.S. Cl.
CPC ............. *F15B 11/165* (2013.01); *E02F 9/2012* (2013.01); *E02F 9/2203* (2013.01); *E02F 9/2235* (2013.01); *E02F 9/2282* (2013.01); *F15B 21/042* (2013.01); *F15B 2211/20523* (2013.01); *F15B 2211/20546* (2013.01); *F15B 2211/20576* (2013.01); *F15B 2211/26* (2013.01); *F15B2211/41518* (2013.01); *F15B 2211/6346* (2013.01); *F15B 2211/6355* (2013.01); *F15B 2211/66* (2013.01); *F15B 2211/6652* (2013.01); *F15B 2211/6655* (2013.01); *F15B 2211/6658* (2013.01); *F15B 2211/851* (2013.01)

USPC ............................................................ 701/50

(56) References Cited

U.S. PATENT DOCUMENTS

| | | | | |
|---|---|---|---|---|
| 2010/0262353 | A1* | 10/2010 | Hyodo et al. | 701/102 |
| 2011/0146283 | A1* | 6/2011 | Narazaki et al. | 60/701 |
| 2011/0167811 | A1* | 7/2011 | Kawaguchi et al. | 60/395 |

FOREIGN PATENT DOCUMENTS

| | | | |
|---|---|---|---|
| JP | 9-151487 | A | 6/1997 |
| JP | 2001-140678 | A | 5/2001 |
| JP | 2001-193702 | A | 7/2001 |
| JP | 2002-295408 | A | 10/2002 |
| JP | 2007-162754 | A | 6/2007 |

* cited by examiner

Fig.4A

<Actuation pattern>

| | 1 | 2 | 3 | 4 | 5 |
|---|---|---|---|---|---|
| Boom operation detector | on/off | ON | OFF | ON | OFF |
| Travelling operation detector | on/off | OFF | ON | ON | OFF |
| Torque position | P | E 1 | | | E 2 |

Fig.4B

<Output pattern>

| Torque position | Maximum torque rate |
|---|---|
| P | 100% |
| E 1 | 80% |
| E 2 | 60% |

WORKING MACHINE WITH VARIABLE DISPLACEMENT HYDRAULIC PUMP

TECHNICAL FIELD

The present invention relates to a working machine such as a back hoe.

BACKGROUND ART

Conventionally, there has been a working machine described in Patent Literature 1.

In this working machine, there are provided: an engine; a variable displacement hydraulic pump driven by this engine; maximum absorption torque setting means setting the maximum absorption torque of this hydraulic pump; a travelling device, an upper rotating body, a boom, an arm and a bucket which are hydraulically driven by discharge oil of the hydraulic pump; a travelling operation lever, a rotating/arm operation lever and a boom/bucket operation lever operating these.

It is disclosed that, in this working machine, by detecting a specified operation state of the operation lever, it is detected that the working machine is in a specified operation state, when the working machine is in a specified state, a maximum value of the absorption torque of the hydraulic pump is changed in setting to a rather high value.

CITATION LIST

Patent Literature

Patent Literature 1: Japanese Unexamined Patent Publication JP-A2002-295408

SUMMARY OF INVENTION

Technical Problem

When a maximum absorption torque setting value is switched, a discharge amount of a hydraulic pump is changed and there occurs a swinging in a machine body, but since an operator grasps an operation lever, in the case where the machine body swings during operating the operation lever in an intermediate position of a lever stroke, there occurs a problem that, the operation lever is relatively moved with respect to the machine body to thereby exert a bad influence on operability and the machine body acts violently.

Therefore, the present invention is aimed to solve the problem.

Solution to Problem

Technical means made by the present invention for solving the problem have specific features as following.

In a first aspect of the present invention, there are included: an engine; a variable displacement hydraulic pump driven by this engine; maximum absorption torque setting means setting a maximum absorption torque of this hydraulic pump; a travelling device and a boom hydraulically driven by discharge oil of the hydraulic pump; a travelling operation member operating the travelling device; and a boom operation member operating the boom, wherein E1 position and E2 position having a maximum absorption torque setting value smaller than that of E1 position are set in the maximum absorption torque setting means, wherein there are provided a travelling operation detector detecting a full operation of the traveling operation member and a boom operation detector detecting a full operation of the boom operation member upon operating the boom operation member toward a boom up direction, and wherein when the maximum absorption torque setting value is E2 position, upon detection of a full operation of either one or both of the travelling operation member and the boom operation member, controlling to automatically switch to E1 position is performed.

In a second aspect of the present invention, the travelling operation detector and the boom operation detector detect the full operation of the operation member before an operation terminal position of an operation member to be detected.

In a third aspect of the present invention, P position having a maximum absorption torque setting value larger than that of E1 position is set in the maximum absorption torque setting means, and an inter-switching between E2 position and P position is enabled by manual switching means and is set to be E2 position at the starting time of the engine.

Advantageous Effects of Invention

According to the invention, the following effects are exerted.

According to the first aspect of the present invention, since a full operation of either one or both of the travelling operation member and the boom operation member is detected and rendered to automatically switch to E1 position having a maximum absorption torque setting value larger than that of E2 position and the operation member is operated to an operation terminal position in the full operation, there is no bad influence on the operability due to swinging of the machine body caused by a change of a discharge amount of the main pump and the operability is improved without violent acting of the machine body. In addition, when in a travelling full operation and/or boom up full operation, the torque position is rendered to that having a large maximum absorption torque setting value so that an operation for saving energy and an operation attaching great importance to speed characteristics are simplified and the simplification of the structure can be designed.

According to the second aspect of the present invention, by detecting the full operation of the operation member before an operation terminal position of the operation member, responsibility of switching from E2 position to E1 position is good with respect to the full operation of the operation member.

According to the third aspect of the present invention, since a work is fundamentally performed in E2 position where an output of the hydraulic pump is small, fuel consumption can be suppressed, and when a quick working speed and travelling speed are required, by switching to P position having a high output of the hydraulic pump, the work can be carried out at a high level speed.

In addition, at the full operation time of the operation member, since the position is rendered to be automatically switched from E2 position to E1 position having a maximum absorption torque setting value smaller than that of P position, compatibility between the operability and the reduction in fuel consumption can be intended.

BRIEF DESCRIPTION OF DRAWINGS

FIG. 4A is a table showing an actuation pattern of changeover of a torque position.

FIG. 4B is a table showing an output pattern of a main pump.

DESCRIPTION OF EMBODIMENTS

Figure 1:
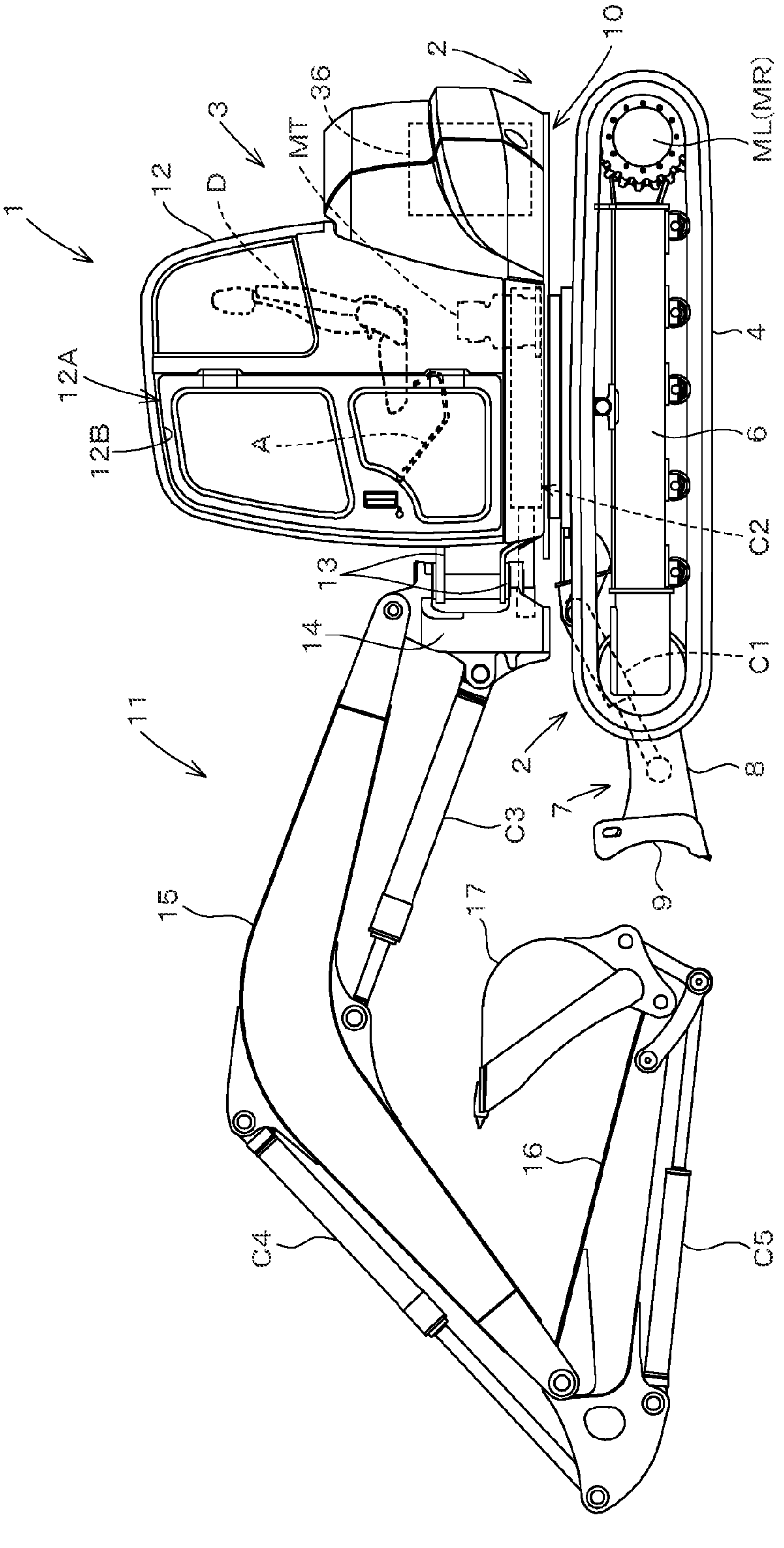
FIG. 1 is a side view of a back hoe.

The following describes an embodiment of the present invention referring to the drawings.

In FIG. 1, reference numeral 1 denotes a back hoe, and the back hoe 1 is mainly composed of a lower part travelling body 2 and an upper part rotating body 3 disposed on this travelling body 2.

The travelling body 2 includes crawler typed travelling devices 5, which are configured to rotate endless belt typed crawler belts 4 in circulation in circumferential directions by travelling motors ML and MR each composed of a hydraulic motor (hydraulic actuator), on both right and left sides of a truck frame 6.

A dozer device 7 is provided on a front portion of the truck frame 6. This dozer device 7 is provided with its rear end side pivotally coupled to the truck frame 6 and a blade 9 provided on a front end side of a vertically swingable supporting arm 8, wherein the supporting arm 8 is driven up and down by expansion and contraction of a dozer cylinder C1 composed of a hydraulic cylinder (hydraulic actuator).

The rotating body 3 includes: a rotating base 10 disposed on the truck frame 6 in a rotatable manner about a vertical rotational axis center; a front working device 11 equipped on a front portion of this rotating base 10; and a cabin 12 disposed on the rotating base 10.

The rotating base 10 is provided with an engine 36, a radiator, a fuel tank, an actuation oil tank, a battery and the like, wherein the rotating base 10 is driven in rotation by a rotating motor MT composed of a hydraulic motor (hydraulic actuator).

In a front portion of the rotating base 10, there is provided a supporting bracket 13 in a manner of protruding frontward from the rotating base 10, and a swing bracket 14 is supported on this supporting bracket 13 in a manner of laterally swingable about a vertical axis center. This swing bracket 14 is laterally swung and driven by a swing cylinder C2 composed of a hydraulic cylinder (hydraulic actuator).

The front working device 11 is mainly composed of: a boom 15 rendered to be vertically swingable with its proximal side pivotally connected to an upper portion of the swing bracket 14 in a manner of rotatable about a lateral axis; an arm 16 pivotally connected to a tip end side of this boom 15 in a manner of rotatable about a lateral axis so as to be swingable back and forth; and a bucket 17 (working tool) pivotally connected to a tip end side of this arm 16 in a manner of rotatable about a lateral axis so as to be swingable back and forth.

The boom 15 is swung and driven by a boom cylinder C3 interposed between the boom 15 and the swing bracket 14, the arm 16 is swung and driven by an arm cylinder C4 interposed between the arm 16 and the boom 15, and the bucket 17 is swung and driven by a bucket cylinder C5 (working tool cylinder) interposed between the bucket 17 and the arm 16.

Each of the boom cylinder C3, arm cylinder C4 and bucket cylinder C5 is composed of a hydraulic cylinder (hydraulic actuator).

A driver seat D is provided in a rear portion in the cabin 12. In addition, a gate 12B openable and closable by a getting-on/off door 12A is provided in a front portion of a left side surface of the cabin 2, and an unload lever A arranged across the gate 12B on a left-sideward of the driver seat D in a manner capable of pulling up.

This unload lever A can be displaced in position to a position which does not prevent the loading and unloading by pulling up the same when an operator gets off, and it is configured so that the operations of various kinds of hydraulic actuators ML, MR, MT and C1 to C5 equipped in the back hoe 1 become impossible.

Figure 2:
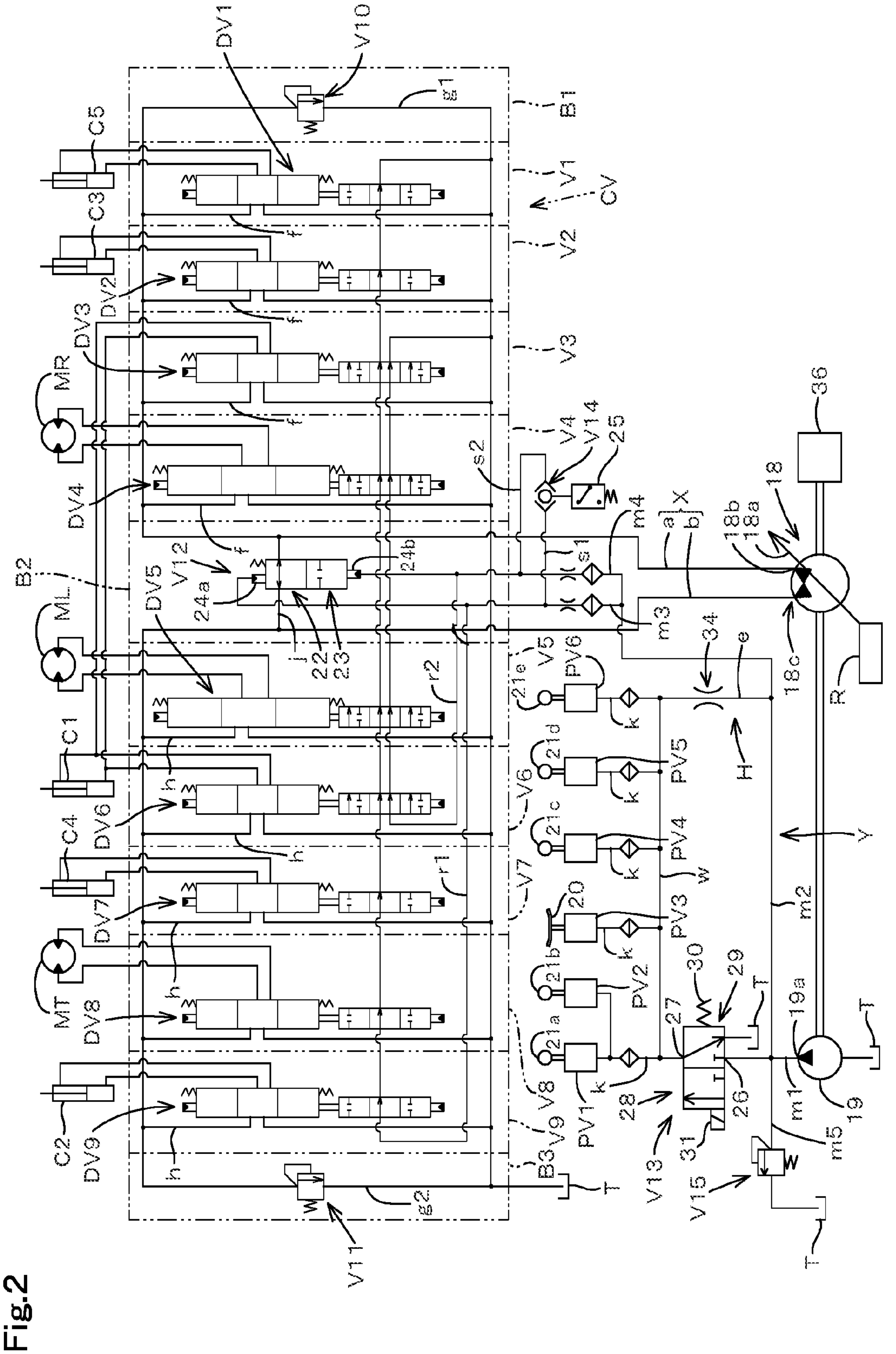
FIG. 2 is a hydraulic circuit diagram of the back hoe.
Figure 3:
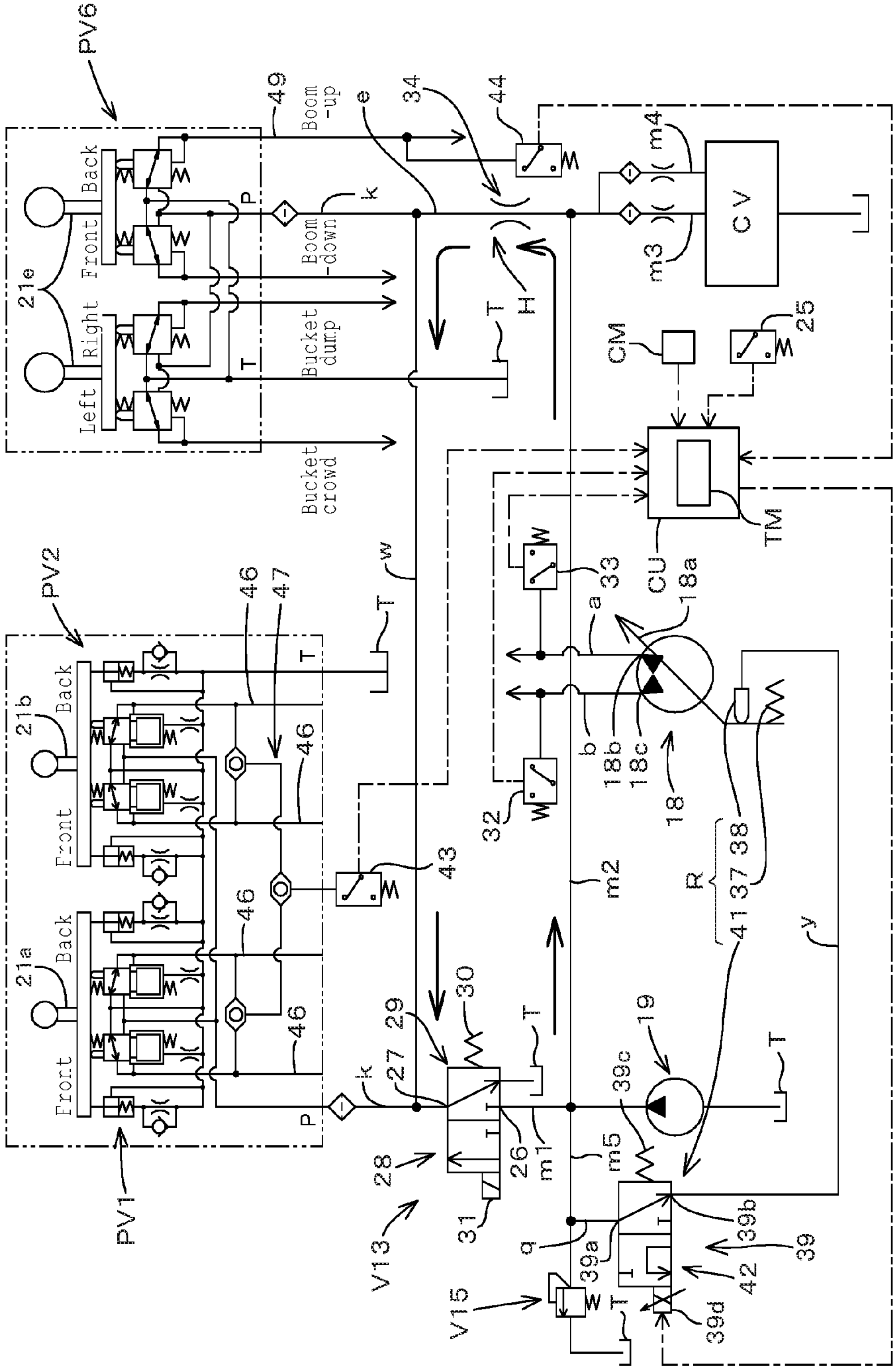
FIG. 3 is a hydraulic circuit diagram of an essential part.

Next, the following describes a hydraulic system for actuating various kinds of hydraulic actuators ML, MR, MT and C1 to C5 equipped in the back hoe 1 referring to FIGS. 2 and 3.

The hydraulic system of this back hoe 1 includes: a control valve CV controlling various hydraulic actuators ML, MR, MT and C1 to C5; a main pump 18 for supplying actuation oil actuating various hydraulic actuators ML, MR, MT and C1 to C5; and a pilot pump 19 for supplying control pilot pressurized oil of a pilot change-over valve and signal pressurized oil such as a pressure detection signal.

The control valve CV is configured by providing: a first block B; a bucket control valve V1 controlling the bucket cylinder C5; a boom control valve V2 controlling the boom cylinder C3; a first dozer control valve V3 controlling the dozer cylinder C1; a right-use travelling control valve V4 controlling the travelling motor MR of the right-side travelling device 5; a second block B2 for taking in pressurized oil; a left-use travelling control valve V5 controlling the travelling motor ML of the left-side travelling device 5; a second dozer control valve V6 controlling the dozer cylinder C1; an arm control valve V7 controlling the arm cylinder C4; a rotation control valve V8 controlling the rotating motor MT; a swing control valve V9 controlling the swing cylinder C2; and a third block B3, which are arranged in this order (arranged in the order from the right in FIG. 2) and are mutually connected.

The respective control valves V1 to V9 include directional change-over valves DV1 to DV9 incorporated within the valve body.

The respective directional change-over valves DV1 to DV9 are intended to switch directions of the pressurized oil with respect to the oil pressure actuators ML, MR, MT and C1 to C5 to be controlled, each of which is composed of a direct operated spool change-over valve and composed of a pilot change-over valve (switch-operated by a pilot pressure) which is pilot-operated.

In addition, each of the directional change-over valves DV1 to DV9 of the respective control valves V1 to V9 is configured such that, each spool is moved in proportion to an operation amount of each of the remote control valves PV1 to PV6 which respectively pilot-operate the directional change-over valves DV1 to DV9 so that the pressurized oil of an amount in proportion to the moved amount of the spool is supplied to the hydraulic actuators ML, MR, MT and C1 to C5 to be controlled (i.e., the actuating speeds of the hydraulic actuators ML, MR, MT and C1 to C5 to be operated are made variable in proportion to the operation amount of each of the remote control valves PV1 to PV6).

Each of the remote control valves PV1 to PV6 is composed of a pilot valve which outputs a pilot pressure proportional to the operation amount from a secondary port (output port) and sends to pilot pressure receiving parts of the directional change-over valves DV1 to DV8 to be operated.

As these remote control valves PV1 to PV6, there are provided a left travelling-use remote control valve PV1 operating the directional change-over valve DV5 of the left-use travelling control valve V5, a right travelling-use remote control valve PV2 operating the directional change-over valve DV4 of the right-use travelling control valve V4, a swing-use remote control valve PV3 operating the directional change-over valve DV9 of the swing control valve V9, a dozer-use remote control valve PV4 operating the directional change-over valve DV3 of the first dozer control valve V3 and the directional change-over valve DV6 of the second dozer control valve V6, a rotating/arm-use remote control valve PV5 operating the directional change-over valve DV8 of the rotating control valve V8 and the directional change-over valve DV7 of the arm control valve V7, and a bucket/boom-use remote control valve PV6 operating the directional change-over valve DV1 of the bucket control valve V1 and the directional change-over valve DV2 of the boom control valve V2.

In the present embodiment, the swing-use remote control valve PV3 is operated by an operation pedal 20 and the other remote control valves PV1, PV2, PV4 to PV6 are operated by operation levers 21*a* to 21*e* (operation member), and any of them is made operable from a position where an operator sits on the driver's seat D.

In addition, the directional change-over valve DV3 of the first dozer control valve V3 and the directional change-over valve DV6 of the second dozer control valve V6 are simultaneously operated by a single dozer-use remote control valve PV3 (simultaneously actuate).

The operation levers 21*a* and 21*b* (travelling operation members) operating the left travelling-use remote control valve PV1 and the right travelling-use remote control valve PV2 are operated back and forth from a neutral position, and when the operation levers 21*a* and 21*b* are tilted forward, the travelling device 2 to be operated is driven forward and when tilted backward, the travelling device 2 to be operated is driven backward.

The operation levers 21*d* and 21*e* operating the rotation/arm-use remote control valve PV5 and the bucket/boom-use remote control valve PV6 are made operable in the two directions of back-and-forth and lateral directions (made operable back-and-forth and laterally from the neutral position).

Regarding the rotation/arm-use remote control valve PV5, the directional change-over valve DV8 of the rotating control valve V8 is operated by operating the operation lever 21*d* in one direction (e.g., lateral direction) and the directional change-over valve DV7 of the arm control valve V7 is operated by operating in the other direction (e.g., back-and-forth direction).

Also, regarding the bucket/boom-use remote control valve PV6, the directional change-over valve DV1 of the bucket control valve V1 is operated by operating the operation lever 21*e* (boom operation member) in one direction (e.g., lateral direction) and the directional change-over valve DV2 of the boom control valve V2 is operated by operating in the other direction (e.g., back-and-forth direction).

In addition, a composite operation can be performed by tilting the operation levers 21*d* and 21*e* of the remote control valves PV5 and PV6 in an oblique direction between the back-and-forth and lateral directions.

Relief valves V10 and V11 are respectively incorporated into the first block B1 and third block B3 and a travelling independent valve V12 is incorporated into the second block B2.

The main pump 18 and pilot pump 19 are driven by (a drive source) such as an engine 36 disposed on the rotating base 10.

The main pump 18 is composed of a variable displacement hydraulic pump provided with a pump displacement control mechanism such as a diagonal plate 18*a*, and it is composed of a diagonal plate type variable displacement axial pump having a function of an equal flow rate double pump discharging pressurized oils of the same amount from two independent discharge ports 18*b* and 18*c* in the present embodiment. More specifically, as the main pump 18, there is adopted a split-flow type hydraulic pump having a mechanism of alternately discharging pressurized oil from one piston cylinder barrel kit to discharge grooves formed inside and outside of a valve plate.

It is noted that the main pump may be composed of one or more single-flow typed hydraulic pump.

A discharge X of this main pump 18 is composed of a first main discharge passage a connected to the first discharge port 18*b* of the main pump 18 and a second main discharge passage b connected to the second discharge port 18*c* of the main pump 18, and these first discharge passage a and second discharge passage b are both drawn into the second block B2.

The first discharge passage a is arranged from the second block B2 to reach the first block B1 via a valve body of the right-use travelling control valve V4→a valve body of the first dozer control valve V3→a valve body of the boom control valve V2→a valve body of the bucket control valve V1, and the terminal of the flow passage is connected to the relief valve V10.

It is made possible to supply the pressurized oil from this first discharge passage a to the respective directional change-over valves DV4, DV3, DV2 and DV1 of the right-use travelling control valve V4, first dozer control valve V3, boom control valve V2 and bucket control valve V1 via pressurized oil branch passages f, respectively.

The second discharge passage b is arranged from the second block B2 to reach the third block B3 via a valve body of the left-use travelling control valve V5→a valve body of the second dozer control valve V6→a valve body of the arm control valve V7→a valve body of the rotating control valve V8→a valve body of the swing control valve V9, and the terminal of the flow passage is connected to the relief valve V11.

It is made possible to supply the pressurized oil from this second discharge passage b to the respective directional change-over valves DV5, DV6, DV7, DV8 and DV9 of the left-use travelling control valve V5, second dozer control valve V6, arm control valve V7, rotating control valve V8 and swing control valve V9 via pressurized oil branch passages h, respectively.

In the control valve CV, there are provided drain oil passages g1 and g2 which are respectively connected to the relief valves V10 and V11, and the respective drain oil passages g1 and g2 are joined together in the third block B3 and arranged to tanks T.

The first discharge passage a and second discharge passage b are mutually connected via a communicating passage j across the travelling independent valve V12 within the second block B2.

The travelling independent valve V12 is composed of a direct operated spool change-over valve and a pilot change-over valve switch-operated with a pilot pressure.

The travelling independent valve V12 is made freely switchable between a joining position 22 permitting the pressurized oil to pass through the communicating passage j and an independent supply position 23 interrupting the pressurized oil to pass through the communicating passage j, wherein it is forced to a direction to be switched to the joining position 22 by a spring.

In the case where this travelling independent valve V12 is in the joining position 22, the discharge oil of the first discharge port 18*b* and the discharge oil of the second discharge port 18*c* are joined and allowed to be supplied to the directional change-over valves DV1 to DV9 of the respective control valves V1 to V9.

In addition, in the case where the travelling independent valve V12 is switched to the independent supply position 23, the discharge oil of the first discharge port 18*b* are allowed to be supplied to the respective directional change-over valves DV4 and DV3 of the right-use travelling control valve V4 and the first dozer control valve V3 and the pressurized oil from the second discharge port 18*c* are allowed to be supplied to the respective directional change-over valves DV5 and DV6 of the left-use travelling control valve V5 and the second dozer control valve V6.

The pilot pump 19 is composed of a fixed displacement gear pump.

A discharge circuit Y of this pilot pump 19 is composed of first to fifth pilot discharge passages m1, m2, m3, m4 and m5.

Regarding the first pilot discharge passage m1, a beginning edge is connected to the discharge port 19*a* of the pilot pump 19 and a terminal edge is connected to a primary port 26 of an unload valve V13.

Regarding the second pilot discharge passage m2, a beginning end is connected to the first pilot discharge passage m1 and a terminal end side is connected to beginning ends of the third pilot discharge passage m3 and fourth pilot discharge passage m4.

The third pilot discharge passage m3 and fourth pilot discharge passage m4 are drawn into the second block B2, and a terminal end of the third pilot discharge passage m3 is connected to one pressure receiving portion 24*a* of the travelling independent valve V12 and a terminal end of the fourth pilot discharge passage m4 is connected to the other pressure receiving portion 24*b* of the travelling independent valve V12.

Regarding the fifth pilot discharge passage m5, a beginning end is connected to the first pilot discharge passage m1 and a terminal end is connected to the relief valve V15 setting a maximum pressure of the discharge circuit Y of the pilot pump 19.

In addition, a beginning end of a first detection oil passage r1 is connected to the third pilot discharge passage m3 and a beginning end of a second detection oil passage r2 is connected to the fourth pilot discharge passage m4.

The first detection oil passage r1 is connected to a drain oil passage g1 via the directional change-over valve DV9 of the swing control valve V9→the directional change-over valve DV8 of the rotating control valve V8→the directional change-over valve DV7 of the arm control valve V7→the directional change-over valve DV6 of the second dozer control valve V6→the directional change-over valve DV5 of the left-use travelling control valve V5→the directional change-over valve DV4 of the right-use travelling control valve V4→the directional change-over valve DV3 of the first dozer control valve V3→the directional change-over valve DV2 of the boom control valve V2→the directional change-over valve DV1 of the bucket control valve V1.

The second detection oil passage r2 is connected to the drain oil passage g1 via the directional change-over valve DV6 of the second dozer control valve V6→the directional change-over valve DV5 of the left-use travelling control valve V5→the directional change-over valve DV4 of the right-use travelling control valve V4→the directional change-over valve DV3 of the first dozer control valve V3.

In the case where the directional change-over valves DV1 to DV9 of the respective control valves V1 to V9 are neutral, the travelling independent valve V12 is retained in the joining position 22 by a spring force.

And when any of the directional change-over valves DV6, DV7, DV5 and DV8 of the respective right-use travelling control valve V4, left-use travelling control valve V5, first dozer control valve V3 and second dozer control valve V6 is operated from the neutral position, there arises a pressure in the second detection oil passage r2 so that the travelling independent valve V12 is switched from the joining position 22 to a independent supply position 23.

At this time, when any of the directional change-over valves DV11, DV10, DV9, DV4, DV3, DV2 and DV1 of the basket control valve V1, boom control valve V2, rotating control valve V8, arm control valve V7 and swing control valve V9 is operated from the neutral position, there arises a pressure in the first detection oil passage r1 so that the travelling independent valve V12 is switched from the independent supply position 23 to the joining position 22.

In addition, a first sensitive oil passage s1 is connected to the third pilot discharge passage m3 and a second sensitive oil passage s2 is connected to the fourth pilot discharge passage m4, and terminal ends of these first and second sensitive oil passages s1 and s2 are connected to a shuttle valve V14, a pressure switch 25 is connected to this shuttle valve V14, and this pressure switch 25 is connected to a control device CU controlling such as the engine 36 and main pump 18 via a transmission path.

In the hydraulic system of the present embodiment, there is provided an automatic idling control system (AI system) automatically operating an accelerator device of the engine 36.

In this automatic idling control system, when the directional change-over valves DV1 to DV9 of the respective control valves V1 to V9 are neutral, since there does not arise a pressure in the first detection oil passage r1 and second detection oil passage r2, the pressure switch 25 is never pressure-sensitively actuated, and in this state, a governor of the engine 36 is automatically controlled by such as an electric actuator so as to be accelerated down to a predetermined idling position. In addition, in the case where even any one of the directional change-over valves DV1 to DV9 of the respective control valves V1 to V9 is operated, there arises a pressure in the first detection oil passage r1 or the second detection oil passage r2, and this pressure is sensed by the pressure switch 25 so that the pressure switch 25 is pressure-sensitively actuated. Then, a command signal is outputted from the control device CU to such as the electric actuator so that the governor is automatically controlled by such as the electric actuator to be accelerated up to a predetermined acceleration position.

A beginning end of a pilot pump oil passage w is connected to a secondary port 27 of the unload valve V13, and primary ports (input ports) of respective remote control valves PV1 to PV6 are connected to this pilot pump oil passage w via a supply oil passage k, respectively (the respective remote control valves PV1 to PV6 are connected to the pilot pump oil passage w in parallel).

Accordingly, the discharge oil of the pilot pump 19 is sent to the pilot pump oil passage w via the unload valve V13 and the pressurized oil is supplied to the primary ports of the respective remote control valves PV1 to PV6 from this pilot pump oil passage w.

The unload valve V13 is composed of a direct operated spool two-position change-over solenoid valve that is switchable between the supply position 28 communicating the first pilot discharge passage m1 (discharge circuit Y of the pilot pump 19) with the beginning end of the pilot pump oil passage w and an unload position 29 interrupting the communication of the first pilot discharge passage m1 (discharge circuit Y of the pilot pump 19) with the beginning end of the pilot pump oil passage w and communicating the beginning end of the pilot pump oil passage w with a tank T.

This unload valve V13 is forced to a direction of being switched to the unload position 29 by the spring 30 and it is situated in the unload position 29 by demagnetizing a solenoid 31 and it is switched to the supply position 28 by magnetizing the solenoid 31. The solenoid 31 of this unload valve V13 is magnetized in a pulling down position of the unload lever A arranged on the left-sideward of the driver seat D and is demagnetized by pulling up the unload lever A.

Therefore, by puling up the unload lever A at the time of getting off, the unload valve V13 is switched to the unload position 29 and the pressurized oil is kept from supplying to each of the remote control valves V1 to V6 so that it becomes impossible to perform the operation of each of the hydraulic actuators ML, MR, MT and C1 to C5.

In order to improve responsibility of each of the remote control valves PV1 to PV6 pilot-operating the directional change-over valves DV1 to DV9 of the respective control valves V1 to V9 at a low temperature time, the hydraulic system is provided with a warming-up circuit H for warming the oil in the pilot pump oil passage w at a time of warming-up drive of the back hoe 1.

This warming-up circuit H is composed of a connection oil passage e connecting terminal end of the pilot pump oil passage w and the discharge circuit Y (second pilot discharge passage m2 in an example shown in the drawing) of the pilot pump 19 and a throttle (flow rate regulating means) 34 interposed in the connection oil passage e.

At the time of warming-up driving the back hoe 1, the warming-up drive is performed in a state that the unload lever A is pulled up and the unload valve V13 is situated in the unload position 29.

Then, first the oil discharged from the pilot pump 19 flows from the discharge circuit Y to a terminal end of the pilot pump oil passage w via the connection oil passage e of the warming-up circuit H. Subsequently, the discharged oil of the pilot pump 19 flowing into the terminal end of the pilot pump oil passage w is fluidly moved to a side of the beginning end of the pilot pump oil passage w and is exhausted to the tank T from the beginning end via the unload valve V13.

That is, since the oil sucked up from the tank T by the pilot pump 19 circulates to the tank T through the pilot pump oil passage w, the oil within the pilot pump oil passage w is warmed.

Thus, since the oil supplied to the primary port is warmed near the primary ports of the remote control valves PV1 to PV6, the responsibility of the remote control valves PV1 to PV6 at the low temperature time can be secured (operability of the remote control valves PV1 to PV6 at the low temperature time can be secured).

In addition, by rendering the oil sucked up from the tank T and discharged from the pilot pump 19 to flow through the pilot pump oil passage w and circulate to the tank T, there can be obtained an enough warming-up effect and a warming-up time can be also reduced.

In addition, since the second pilot discharge passage m2 sending the discharge oil of the pilot pump 19 to the control valve CV is also warmed early at the same time, there is an effect exerted also on warming-up of a signal circuit of the automatic idling control system and warming-up of oil within the first and second detection oil passages r1 and r2.

In addition, the throttle 34 provided in the warming-up circuit H regulates a flow rate of the oil flowing from the discharge circuit Y of the pilot pump 19 to the pilot pump oil passage w via the connection oil passage e in order that the hydraulic actuators ML, MR, MT and C1 to C5 to be operated are not activated even though the remote control valves PV1 to PV6 are operated in a state that the unload valve V13 is being switched to the unload position 29 (in order that there does not arise a pressure in the secondary ports of the remote control valves PV1 to PV6 such that each of the directional change-over valves DV1 to DV9 are pilot-operated).

Therefore, even though the discharged oil of the pilot pump 19 is rendered to flow through the pilot pump oil passage w via the warming-up circuit H in the state that the unload valve V13 is situated in the unload position 29, each of the control valves V1 to V9 is never operated by each of the remote control valves PV1 to PV6. Further, in the state that the unload valve V13 is situated in the supply position 28, the discharged oil of the pilot pump 19 flows to the pilot pump oil passage w via the unload valve V13 as usual so that each of the control valves V1 to V9 are made operable by each of the remote control valves PV1 to PV6 and there occurs no consumption of a flow rate.

In addition, at the time of operating the remote control valves PV1 to PV6 to generate a secondary pressure, the unload valve V13 is switched to the supply position 28 so that the discharged oil of the pilot pump 19 is supplied from the side of the beginning end to the pilot pump oil passage w, but since the warming-up circuit H connects the discharge circuit Y of the pilot pump 19 to the terminal end of the pilot pump oil passage w, the warming-up circuit H does not cause a response delay at the time of operating the remote control valves PV1 to PV6.

Further, by constituting the flow rate regulating means regulating a flow rate of the oil flowing from the discharge circuit Y of the pilot pump 19 to the pilot pump oil passage w via the connection oil passage e by the throttle 34, it can be provided at a low cost.

Moreover, although the pilot pump oil passage w is usually formed of a hydraulic hose, since flowability of the oil in the pilot pump oil passage w at a low temperature time can be improved by providing the warming-up circuit H, it becomes possible to reduce a size of the hydraulic hose constituting the pilot pump oil passage w, and by reducing the size, a layout (running) of the hose at the time of arranging the hydraulic hose constituting the pilot pump oil passage w can be easily performed.

Figure 5:
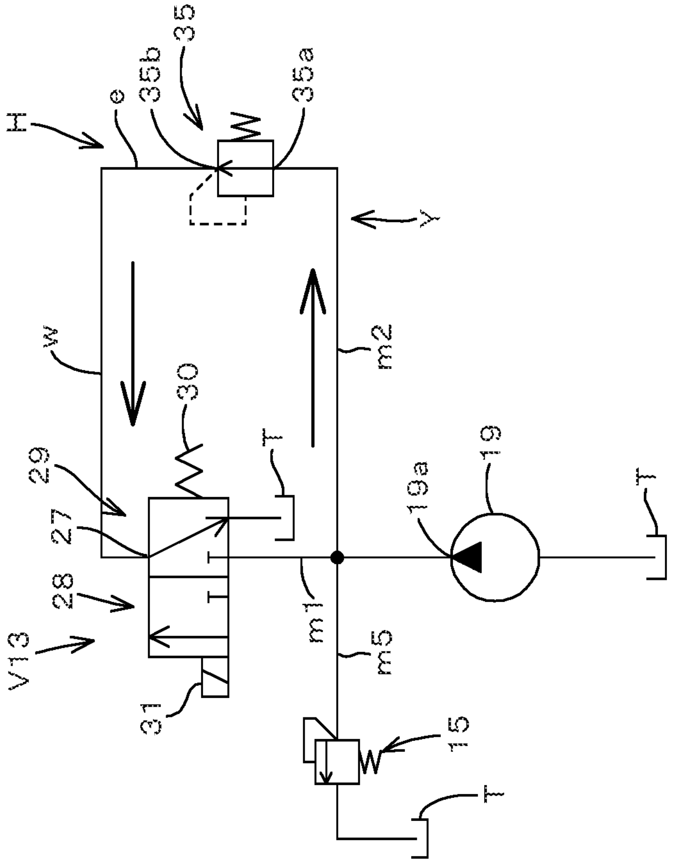
FIG. 5 is a hydraulic circuit diagram showing another embodiment.

In addition, the flow rate regulating means regulating a flow rate of the oil flowing from the discharge circuit Y of the pilot pump 19 to the pilot pump oil passage w via the connection oil passage e should not be limited to the throttle 34. That is, this flow rate regulating means may be configured so long as to be able to regulate a flow rate of the oil flowing from the discharge circuit Y of the pilot pump 19 to the pilot pump oil passage w via the connection oil passage e in order that the hydraulic actuators ML, MR, MT and C1 to C5 to be operated are not activated even though the remote control valves PV1 to PV6 are operated in a state that the unload valve V13 is being switched to the unload position 29, and this flow rate regulating means may be composed of, for example, a pressure reducing valve 35 as shown in FIG. 5.

In the case of this embodiment, a primary port 35*a* (high pressure port) of the pressure reducing valve 35 is connected to an oil passage e1 in a side of the discharge circuit Y of the connection oil passage e and a secondary port 35*b* (pressure reducing port) of the pressure reducing valve 35 is connected to an oil passage e2 in a side of the pilot pump oil passage w of the connection oil passage e. Moreover, the pressure reducing valve 35 is pressed to a direction of opening the spool by a pressure of the secondary port 35*b* and is forced to a direction of closing the spool by a spool spring 35*c*.

A spring pressure of the spool spring 35*c* of the pressure reducing valve 35 is set such that a pressure of the secondary port 35*b* of the pressure reducing valve 35 becomes a pressure that the hydraulic actuators ML, MR, MT and C1 to C5 to be operated are not activated even though the remote control valves PV1 to PV6 are operated in a state that the unload valve V13 is being switched to the unload position 29.

In addition, in the hydraulic system of the present embodiment, a torque control regulating a maximum absorption torque of the main pump 18 is performed such that the absorption torque of the main pump 18 does not exceed a set value (maximum absorption torque) and the set value of this maximum absorption torque can be altered in setting to a plurality of set values.

The torque control regulating the maximum absorption torque of this main pump 18 is performed by changing an inclination rotating angle of a swash plate 18*a* of the main pump 18 such that the displacement of the main pump 18 is reduced as the discharged pressure of the main pump 18 increases.

As shown in FIG. 3, detection of a discharge pressure of the main pump 18 is performed by discharge pressure detectors 32 and 33 composed of pressure switches respectively connected to a first discharge passage a and a second discharge passage b. Detection signals of these discharge pressure detectors 32 and 33 are transmitted to the control device CU via a transmission path.

The control of the inclination rotating angle of the swash plate 18*a* of the main pump 18 is performed by a regulator R.

In the present embodiment, this regulator R is provided with a swash plate spring 37 forcing the swash plate 18*a*, a swash plate actuator 38 pressing the swash plate 18*a* and a swash plate control valve 39 controlling a pressing force of this swash plate actuator 38. The inclination rotating angle of the swash plate 18*a* of the main pump 18 is controlled by the forcing force of the swash plate spring 37 and the pressing force of the swash plate actuator 38.

It is noted that the regulator R shown in the present embodiment shows one example and a known regulator controlling such as a swash plate of a variable displacement hydraulic pump can be adopted other than the regulator R of an exemplified configuration.

The swash plate control valve 39 is composed of a solenoid proportional pressure reducing valve and is controlled by an output current outputted from the control device CU.

A primary port 39*a* of this swash plate control valve 39 is connected to the discharge circuit Y of the pilot pump 19 (fifth pilot discharge passage m5 as an example in the drawing) via a communication passage q, and a secondary port 39*b* of the swash plate control valve 39 is connected to the swash plate actuator 38 via the control oil passage y.

This swash plate control valve 39 includes: a spring 39*c* forcing the spool to be moved in a direction toward a side of a communicating position 41 communicating between the primary port 39*a* and the secondary port 39*b*; and a proportional solenoid 39*d* interrupting the communication between the primary port 39*a* and the secondary port 39*b* and moving the spool toward a side of a interrupting position 42 for communicating the secondary port 35*b* with the tank T (generating a force opposing to the forcing force of the spring).

In addition, the swash plate control valve 39 is controlled such that, when output current (magnetizing current) outputted from the control device CU to the proportional solenoid 39*d* increases, a secondary pressure outputted to the swash plate actuator 38 decreases (the pressing force of the swash plate actuator 38 decreases).

Then, in accordance with the discharge pressure of the main pump 18 detected by the pressure switches 32 and 33 and inputted to the control device CU, a command signal is outputted from the control device CU to the proportional solenoid 39*d* of the swash plate control valve 39 and the swash plate 18*a* is controlled such that the maximum absorption torque of the main pump 18 becomes a set maximum absorption torque setting value.

The control device CU includes maximum absorption torque setting means TM setting a maximum absorption torque setting value of the main pump 18.

In this maximum absorption torque setting means TM, a plurality of torque positions with different maximum absorption torque setting values are set so as to be able to be changed to the maximum absorption torque setting values set in these torque positions.

Regarding the torque positions, in the present embodiment, the maximum absorption torque setting value of the main pump 18 can be changed to three torque positions (maximum absorption torque setting values) of P position (power mode), E1 position (low economy mode) with a maximum absorption torque setting value smaller than that of this P position and E2 position (high economy mode) with a maximum absorption torque setting value smaller than that of this E1 position.

In the back hoe 1, as shown in FIG. 4B, for example, a maximum absorption torque setting value in P position is set to be in the vicinity of a maximum torque value of output torque characteristics of the engine 36 (so as not to exceed the maximum torque value), the maximum absorption torque setting value in E1 position is set to be 80% of the maximum absorption torque setting value in P position, and the maximum absorption torque setting value in E2 position is set to be 60% of the maximum absorption torque setting value in P position.

It is noted that the back hoe 1 is used with a target revolution number of the engine 36 fixed to be a desired target revolution number while each of the maximum absorption torque setting values in the torque positions is kept unchanged.

An interchange between P position and E2 position is allowed by manually operated switching means CM such as a manual switch which is provided in the vicinity of the driver seat D. In the present embodiment, it is set that, when the engine 36 is started, E2 position is automatically set and it is possible to switch from E2 position to P position by the switching means CM and it is also possible to switch from P position to E2 position.

Therefore, since a work is fundamentally performed in E2 position where an output of the main pump 18 is small, fuel consumption can be suppressed (fuel-efficient). In addition, when quick working speed and travelling speed are required, it is possible to drive the front working device 11, dozer device 7, rotating base 10, swing bracket 14 and travelling motors ML and MR at a high level speed by switching to P position in which an output of the main pump 1B is high.

An interchange between E2 position and E1 position is automatically performed.

In the present embodiment, when one or both of the operating levers 21*a* and 21*b* operating the left travelling-use remote control valve PV1 and right travelling-use remote control valve PV2 are full-operated (to operate an operating lever to an operation terminal end position (stroke end)) or when the operating lever 21*e* operating the bucket/boom-use remote control valve PV6 is full-operated toward a boom up direction, or when one or both of the operating levers 21*a* and 21*b* operating the left travelling-use remote control valve PV1 and right travelling-use remote control valve PV2 are full-operated and the operating lever 21e operating the bucket/boom-use remote control valve PV6 is full-operated toward a boom up direction, the change-over from E2 position to E1 position is performed.

Detection of this full-operation of the operating levers 21a and 21b of the left travelling-use remote control valve PV1 and right travelling-use remote control valve PV2 is performed by a travelling operation detector 43 and detection of the full-operation toward the boom up direction of the operating lever 21e of the bucket/boom-use remote control valve PV6 is performed by a boom operation detector 44. These detectors 43 and 44 are each composed of a pressure switch in the present embodiment.

The travelling operation detector 43 is connected to travelling command oil passages 46 via a connection circuit 47, the travelling command oil passages 46 sending pilot pressures from the left travelling-use remote control valve PV1 and right travelling-use remote control valve PV2 to the left travelling-use control valve V5 and right travelling-use control valve V4, and it is configured that the full-operation of at least one operating lever 21a or 21b of the two travelling operating levers 21a and 21b is detected by detecting pressures of the travelling command oil passages 46 (secondary pressures of the remote control valves PV1 and PV2).

The boom operation detector 44 is connected to a boom-up command oil passage 49 sending a pilot pressure from the bucket/boom-use remote control valve PV6 to a receiving portion of a boom-up operation side of the directional change-over valve DV2 of the boom control valve V2, and it is configured that the full-operation toward the boom-up side of the operating lever 21e is detected by detecting a pressure of the boom-up command oil passage 49 (secondary pressure of a boom-up command outputting port of the remote control valve PV6).

The travelling operation detector 43 and boom operation detector 44 are connected to the control device CU via a transmission path so that the detection signals of the travelling operation detector 43 and boom operation detector 44 are inputted to the control device CU.

As shown in FIG. 4A, when switching to P position, even whether the travelling operation detector 43 and boom operation detector 44 are any of on/off, P position remains (actuation pattern 1).

In addition, in the case where the torque position is E2 position, when one of the travelling operation detector 43 and boom operation detector 44 is on and the other is off (actuation pattern 2 and 3) or both of them are on (actuation pattern 4), the torque position is switched to E1 position.

Further, in the case where the travelling operation detector 43 and boom operation detector 44 are both off, when the torque position is E2 position, E2 position remains (actuation pattern 5).

Next, the detection of the full-operations of the operating levers 21a, 21b and 21e described above are explained referring to FIG. 4C.

Figure 4C:
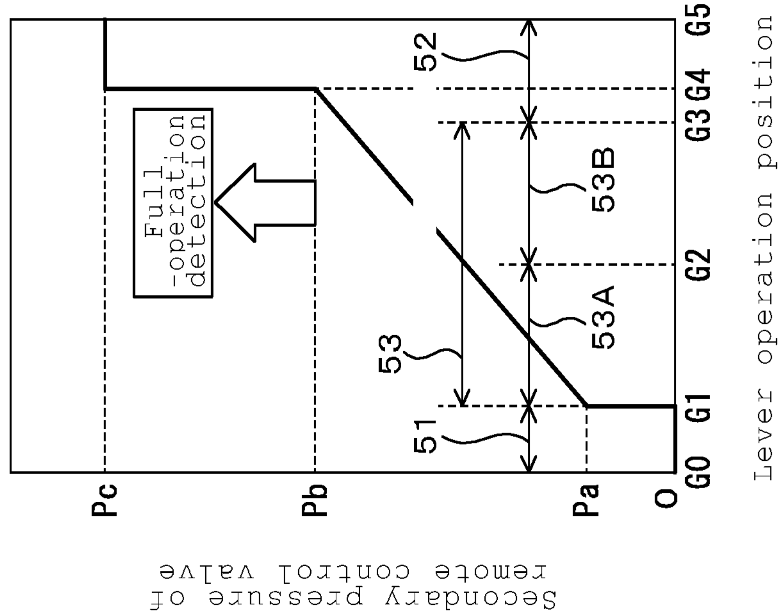
FIG. 4C is a characteristic diagram of a secondary side pressure of a remote-control valve with respect to an operating position of an operating lever.

FIG. 4C is a characteristic diagram representing changes of the secondary pressures of the remote control valves PV1, PV2 and PV6 with respect to the lever operation positions of the operating levers 21a, 21b and 21e, wherein the secondary pressures of the remote control valves PV1, PV2 and PV6 are taken as the vertical axis and the lever operation positions of the operating levers 21a, 21b and 21e are taken as the horizontal axis.

The secondary pressure becomes larger in pressure as is far away from the origin point.

The lever operation position is an operation beginning end position (neutral position, G0 position) with the origin point as the beginning end position of the lever stroke and closes nearer to the operation terminal end position (G5 position) of the lever stroke as is far away from the origin point.

The operation region of the operating levers 21a, 21b and 21e is divided into a neutral region 51 (from G0 position to G1 position in the drawing) in which an operation target object is not operated, a full-operation neighbor region 52 (from G3 position to G5 position in the drawing) in the vicinity of the operation terminal end and an intermediate region 53 (from G1 position to G3 position in the drawing) between the neutral region 51 and the full-operation neighbor region 52. Further, the intermediate region 53 is divided into a minute speed region 53A from G1 position to G2 position and an intermediate speed region 53B from G2 position to G3 position.

In the neutral region, since the secondary pressure does not rise even though the operating levers 21a, 21b and 21e are operated, the left-use travelling control valve V5, right-use travelling control valve V4 and boom control valve V2 are not actuated.

In the full-operation neighbor region 52, speed adjustment of an operation target object is never done, and therefore the operating levers 21a, 21b and 21e are operated up to the operation terminal end position (G5 position) without stopping in the way.

In the intermediate region 53, the operating levers 21a, 21b and 21e are stopped and/or changed in position in any position within the region so that the speed of the operation target object is adjusted to be a speed desired by an operator.

For example, ratios of the respective operation regions 51, 53A, 53B and 52 with respect to the lever strokes are about Neutral region 51: equal to or larger than 0% and smaller than 15%, Minute speed region 53A: equal to or larger than 15% and smaller than 45%, Intermediate speed region 53B: equal to or larger than 45% and smaller than 75%, Full-operation neighbor region 52: from 75% to 100%.

In this characteristic diagram shown in FIG. 4C, when the operating levers 21a, 21b and 21e are operated from G0 position to G1 position, the secondary pressure (Pa) is generated, and when the operating levers 21a, 21b and 21e are operated from G1 position to G4 position, the secondary pressure is raised from Pa to Pb in proportion to an operated amount of the operating levers 21a, 21b and 21e, and with this secondary pressure (Pb), the spools of the directional change-over valves DV2, DV4 and DV5 of the boom control valve V2, right-use travelling control valve V4 and left-use travelling control valve V5 are operated to the stroke end.

Further, in G4 position, a primary pressure is short-cut and flows to a secondary side so that the secondary pressure is raised from Pb to the highest output pressure Pc at a burst. Then, while the operating levers 21a, 21b and 21e are operated from G4 position to G5 position, the secondary pressure is constant at the highest output pressure (Pc).

In the present embodiment, the travelling operation detector 43 and boom operation detector 44 are rendered to detect the full-operations of the operating levers 21a, 21b and 21e by detecting the secondary pressures when the operating levers 21a, 21b and 21e are positioned in the vicinity of the operation terminal end. In specific, it is rendered to detect the secondary pressures (the lowest pressure Pb of the secondary pressure in G4 position) when the operating levers 21a, 21b and 21e are in G4 position (neighbor position of the beginning terminal position G3 of the full-operation neighbor region 52), that is, in the position just before the operation terminal end positions of the operating levers 21*a*, 21*b* and 21*e*.

As described above, since the operating levers 21*a*, 21*b* and 21*e* are operated up to the operation terminal end position (G5 position) without stopping in the way in the full-operation neighbor region 52, G4 position is a pass-through point when the operating levers 21*a*, 21*b* and 21*e* are full-operated, and there is no problem even though the full-operations of the operating levers 21*a*, 21*b* and 21*e* are detected in G4 position.

In the present embodiment, since it is rendered to detect the full-operations of the operating levers 21*a*, 21*b* and 21*e* just before the operation terminal end positions of the operating levers 21*a*, 21*b* and 21*e*, responsibility of switching from E2 position to E1 position with respect to the full-operations of the operating levers 21*a*, 21*b* and 21*e* is good.

It is noted that, in detecting the full-operations of the operating levers 21*a*, 21*b* and 21*e* just before positioning in the operation terminal end position, the travelling operation detector 43 and boom operation detector 44 may detect the secondary pressure in G3 position or may detect the secondary pressure in a position between G3 position and G4 position, or may detect a secondary pressure between Pb and Pc in G4 position (or a secondary pressure in the vicinity of Pb).

Further, even if not just before positioning in the terminal end position, the full-operations of the operating levers 21*a*, 21*b* and 21*e* may be detected when the operating levers 21*a*, 21*b* and 21*e* are positioned in the operation terminal end positions.

Furthermore, in the present embodiment, although the secondary pressure is raised from Pb to the highest output pressure Pc at a burst in G4 position, the secondary pressure may be raised in proportion to the operation amount of the operating levers 21*a*, 21*b* and 21*e* from G1 position to G5 position (operation terminal end position).

In the present embodiment, the detection signals of the travelling operation detector 43 and boom operation detector 44 are transmitted to the control device CU, and when the torque position is E2 position, the control device CU switches the torque position to E1 position.

In addition, the torque position is switched by the control device CU such that, when the operating levers 21*a*, 21*b* and 21*e* are returned from the operation terminal end positions to the neutral position side so that the secondary pressures of the remote control valves PV1, PV2 and PV6 become smaller than Pb, the torque position returns to E2 position.

In addition, by the operations (operations in the intermediate region 53) other than the full-operations of the operating levers 21*a*, 21*b* and 21*e*, the torque position is not switched from E2 position to E1 position.

As described above, since it is controlled such that, at the time of full-operations of the operating levers 21*a* and 21*b* operating the travelling device 5 and/or at the time of boom-up full-operation of the operating lever 21*e* operating the boom 15, the torque position is automatically switched to E1 position, and by an operation other than the full-operation of the operating levers 21*a*, 21*b* and 21*e*, the torque position is not switched, an energy saving operation (travelling operation and working operation) and an operation attaching great importance to speed properties (boom-up full-operation time at a time of lifting up the bucket by the boom at a travelling straight full-operation time, steering/spin-turn full-operation time, excavating time and the like) are simplified and simplification of the structure can be achieved.

In addition, the detection of the operation attaching great importance to speed properties can be performed by detections of two positions so as to be economical with high reliability.

Moreover, since it is rendered to automatically switch to E1 position but not P position, compatibility between operability and reduction in fuel consumption can be ensured.

In addition, in the conventional technique, in the case where a maximum absorption torque setting value is changed, the discharge amount of the main pump 18 is changed and there occurs a swing in the machine body of the back hoe 1, but since an operator grasps the operating levers 21*a*, 21*b* and 21*e*, if the machine body of the back hoe 1 swings in the operation (operation in the intermediate region 53) other than the full-operation, the operating levers 21*a*, 21*b* and 21*e* are moved relatively to the machine body, which arises a problem of adversely affecting operability and the machine body acting violently.

Whereas, in the present embodiment, it is rendered to be automatically switched to E1 position by the full-operations of the operating levers 21*a*, 21*b* and 21*e*, and the operating levers 21*a*, 21*b* and 21*e* are operated in the operation terminal end positions in the full-operations, and since the members operated by the operating levers 21*a*, 21*b* and 21*e* in the operation terminal end positions are pushed to valve body sides of the remote control valves PV1, PV2 and PV6 so that the operating levers 21*a*, 21*b* and 21*e* are stably retained, there is no adversely affecting the operability due to a swing of the machine body caused by a change of a discharge amount of the main pump 18 and, for example, the machine body can be rotated smoothly while preventing the machine body from acting violently at such as a steering time so that the operability is improved.

In addition, when the operating levers 21*a*, 21*b* and 21*e* are returned from the operation terminal end positions to the intermediate region 53, the torque position is switched from E1 position to E2 position and the discharge amount of the main pump 18 is changed also at this time, but in this case, since the switching from E1 position to E2 position is performed in the way of operation of the operating levers 21*a*, 21*b* and 21*e*, there is no problem.

In addition, in the conventional technique, when a composite operation of a plurality of operating levers is a predetermined combined composite operation, since the maximum absorption torque setting value of the hydraulic pump is rendered to be switched to a rather high setting value, there may be a case where the maximum absorption torque setting value is switched in the neutral position 51. In this case, even though the maximum absorption torque setting value is switched and the discharge amount of the main pump 18 is changed, there is no adverse affecting on the operability of the operating levers, but since a work etc. is performed with a rather high maximum absorption torque setting value also in the operation in the minute speed region 53A, there occurs useless fuel consumption.

Whereas, in the back hoe 1 of the present embodiment, since the maximum absorption torque setting value is not switched in the neutral region 51, minute speed region 53A and intermediate speed region 53B (since the maximum absorption torque setting value is switched by the full-operations of the operating levers 21*a*, 21*b* and 21*e*), the back hoe 1 can be securely operated in E2 position in which the maximum absorption torque setting value is small in an operation region where saving energy is desired.

Moreover, in the case of detecting the full-operations of the operating levers 21*a*, 21*b* and 21*e* by detecting the secondary pressures of the remote control valves PV1, PV2 and PV6, in the case where a temperature of oil in the pilot pump oil passage w is low at a low temperature time, when the operating levers 21*a*, 21*b* and 21*e* are full-operated, the secondary pressures of the remote control valves PV1, PV2 and PV6 are hard to rise and there is a fear that there may occur a response delay in switching to E1 position, but since the warming-up circuit H is provided in the present embodiment, the responsibility of the remote control valves PV1, PV2 and PV6 are good also at a low temperature time, the responsibility in switching to E1 position is good at the time of full-operations of the operating levers 21*a*, 21*b* and 21*e*.

It is noted that, although a case of providing three torque positions is exemplified in the present embodiment, four or more torque positions may be provided (for example, such as a torque position having a maximum absorption torque setting value between P position and E1 position).

In addition, in the present embodiment, although the maximum absorption torque setting value in E1 position is set smaller than that in P position which is set near the maximum torque value of the output torque characteristics of the engine 36, the maximum absorption torque setting value in E1 position may be set in the vicinity of the maximum torque value of the output torque characteristics of the engine 36 (therefore, in this case, resulting in P position=E1 position).

REFERENCE SIGNS LIST

5: travelling device
15: boom
18: hydraulic pump (main pump)
21*a*: travelling device member
21*b*: travelling device member
21*e*: boom operation member
36: engine
43: travelling operation detector
44: boom operation detector
TM: maximum absorption torque setting means
CM: change-over means

The invention claimed is:

1. A hydraulic pump control system for a working machine comprising:

an engine;

a variable displacement hydraulic pump driven by the engine to discharge a discharge oil;

a travelling device hydraulically travelling with use of the discharge oil discharged from the variable displacement hydraulic pump;

a travelling operation member operable to make an instruction related to the travelling of said travelling device;

a travelling operation detector configured to detect a first full operation that is a state where the travelling operation member is operated to a maximum extent or a pass-through position of at least 75% of the maximum extent;

a boom configured to move upward and downward with use of the discharge oil discharged from the variable displacement hydraulic pump;

a boom operation member operable to make an instruction related to an upward-moving and a downward-moving of the boom;

a boom operation detector for detecting a second full operation that is a state where the boom operation member is operated to a maximum extent or a pass-through position of at least 75% of the maximum extent; and a control device configured to control the variable displacement hydraulic pump and set a value of a maximum absorption torque of the variable displacement hydraulic pump to a plurality of different values including a first value and a second value, the second value being smaller than the first value, wherein the control device is configured to automatically set the value of the maximum absorption torque of the variable displacement hydraulic pump to the second value when the first full operation and the second full operation are not detected, and is configured to automatically set the value of the maximum absorption torque of the variable displacement hydraulic pump to the first value upon detection of at least one of the first full operation and the second full operation.

2. The hydraulic pump control system for the working machine according to claim 1, wherein the first full operation is detected through detecting of the pass-through position of the travelling operation member by said travelling operation detector, the pass-through position of the travelling operation member being a position of the travelling operation member anterior to a position where the travelling operation member is operated to the maximum extent, and wherein the second full operation is detected through detecting of the pass-through position of the boom operation member by said boom operation detector, the pass-through position of the boom operation member being a position of the boom operation member anterior to a position where the boom operation member is operated to the maximum extent.

3. The hydraulic pump control system for the working machine according to claim 1, wherein the plurality of different values further include a third value larger than the first value, and the hydraulic pump control system for the working machine further comprises a manual switch operable to be switched between a position corresponding to the second value and a position corresponding to the third value, and wherein the control device is further configured to set the value of the maximum absorption torque of the variable displacement hydraulic pump to the second value at the starting time of the engine.

4. The hydraulic pump control system for the working machine according to claim 2, wherein the plurality of different values further include a third value larger than the first value, and the hydraulic pump control system for the working machine further comprises a manual switch operable to be switched between a position corresponding to the second value and a position corresponding to the third value, and wherein the control device is further configured to set the value of the maximum absorption torque of the variable displacement hydraulic pump to the second value at the starting time of the engine.

* * * * *